US011620358B2

(12) United States Patent
Chauhan et al.

(10) Patent No.: US 11,620,358 B2
(45) Date of Patent: Apr. 4, 2023

(54) TECHNOLOGIES FOR PERFORMING MACRO OPERATIONS IN MEMORY

(71) Applicant: Intel Corporation, Santa Clara, CA (US)

(72) Inventors: Chetan Chauhan, Folsom, CA (US); Rajesh Sundaram, Folsom, CA (US); Richard Coulson, Portland, OR (US); Bruce Querbach, Hillsboro, OR (US); Jawad B. Khan, Portland, OR (US); Shigeki Tomishima, Portland, OR (US); Srikanth Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 850 days.

(21) Appl. No.: 16/411,730

(22) Filed: May 14, 2019

(65) Prior Publication Data

US 2019/0266219 A1  Aug. 29, 2019

(51) Int. Cl.
*G06F 17/16* (2006.01)
*G06F 9/30* (2018.01)

(52) U.S. Cl.
CPC .......... *G06F 17/16* (2013.01); *G06F 9/3004* (2013.01)

(58) Field of Classification Search
CPC ........ G06F 17/16; G06F 7/78; G06F 9/30101; G06F 9/3895; G06F 12/0207; G06F 15/785; G06F 9/3004; G06F 9/30098; G06F 12/0201; G06N 3/0481; G06N 3/08; G06N 3/0454; G06N 3/063; H01L 27/092; H01L 27/2463
See application file for complete search history.

(56) References Cited

U.S. PATENT DOCUMENTS

| | | | |
|---|---|---|---|
| 2004/0160848 A1* | 8/2004 | Rinerson | G11C 13/0007 365/230.06 |
| 2014/0207992 A1* | 7/2014 | Chi | G06F 13/28 710/308 |
| 2019/0042401 A1 | 2/2019 | Khan et al. | |
| 2019/0237136 A1* | 8/2019 | Tran | G11C 16/0483 |
| 2020/0350226 A1* | 11/2020 | Zheng | H01L 45/16 |

FOREIGN PATENT DOCUMENTS

| | | |
|---|---|---|
| DE | 102018105457 | 9/2018 |
| WO | 2018/217258 | 11/2018 |

OTHER PUBLICATIONS

Kooli, "Smart Instruction Codes for In-Memory Computing Architectures Compatible with Standard SRAM Interfaces", Mar. 19, 2018, 2018 Design, Automation & Test in Europe Conference & Exhibition (DATE), pp. 1-7 (Year: 2018).*

(Continued)

*Primary Examiner* — Matthew D Sandifer
(74) *Attorney, Agent, or Firm* — Compass IP Law PC (57) ABSTRACT

Technologies for performing in-memory macro operations include a memory having a media access circuitry connected to a memory media. The media access circuitry is to receive a request to perform an in-memory macro operation indicative of a set of multiple in-memory operations. The media access circuitry is also to perform, in response to the request, the in-memory macro operation on data present in the memory media.

17 Claims, 7 Drawing Sheets

(56) References Cited

OTHER PUBLICATIONS

Si, "A Twin-8T SRAM Computation-in-Memory Macro for Multiple-Bit CNN-Based Machine Learning", Mar. 7, 2019, 2019 IEEE International Solid State Circuits Conference (ISSCC), 24.5, pp. 396-398 (Year: 2019).*

Steinkraus, "Using GPUs for machine learning algorithms", Aug. 31, 2005, Eighth International Conference on Document Analysis and Recognition (ICDAR'05), 1-6 (Year: 2005).*

Extended European search report for European patent application No. 20166245.9, dated Sep. 16, 2020 (8 pages).

\* cited by examiner

TxpMatrixOperation(TensorOpcode, StartAddressA, StartAddressB, StartAddressC, NumRowsA, NumColumnsA, NumColumnsB)

- TensorOpCode     0 – Matrix-Matrix Multiplication, ...
- StartAddressA     Starting Address of Matrix A (Input) Read from Memory
- StartAddressB     Starting Address of Matrix B (Weight) Read from Memory
- StarAddressC     Starting Address of Matrix C (Ouput) written to Memory
- NumRowsA     Number of rows in Matrix A
- NumColumnsA     Number of columns in Matrix A
- NumColumnsB     Number of columns in Matrix B

FIG. 8

TECHNOLOGIES FOR PERFORMING MACRO OPERATIONS IN MEMORY

BACKGROUND

Traditionally, communications between a processor of a compute device and the memory (e.g., in dynamic random access memory (DRAM) and/or non-volatile memory) are focused on individual read and/or write operations (e.g., a request to read data from a specified address, a request to write data to a specified address, etc.). The amount of time required for a memory to perform a single memory access operation in response to a request is predictable and well-defined. However, communicating individual memory access requests between a processor and a memory (e.g., through a bus) consumes time and energy.

If a memory was capable of performing multiple operations in response to a single request (e.g., from a processor), the latency associated with completing the set of operations may be difficult to ascertain. Furthermore, if the memory was to perform multiple operations that involve more than reading and/or writing data, the latencies associated with responding to the request may be even more difficult to ascertain and coordinating a sequence of operations associated with a workload that relies on the memory to perform operations may be impracticable.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
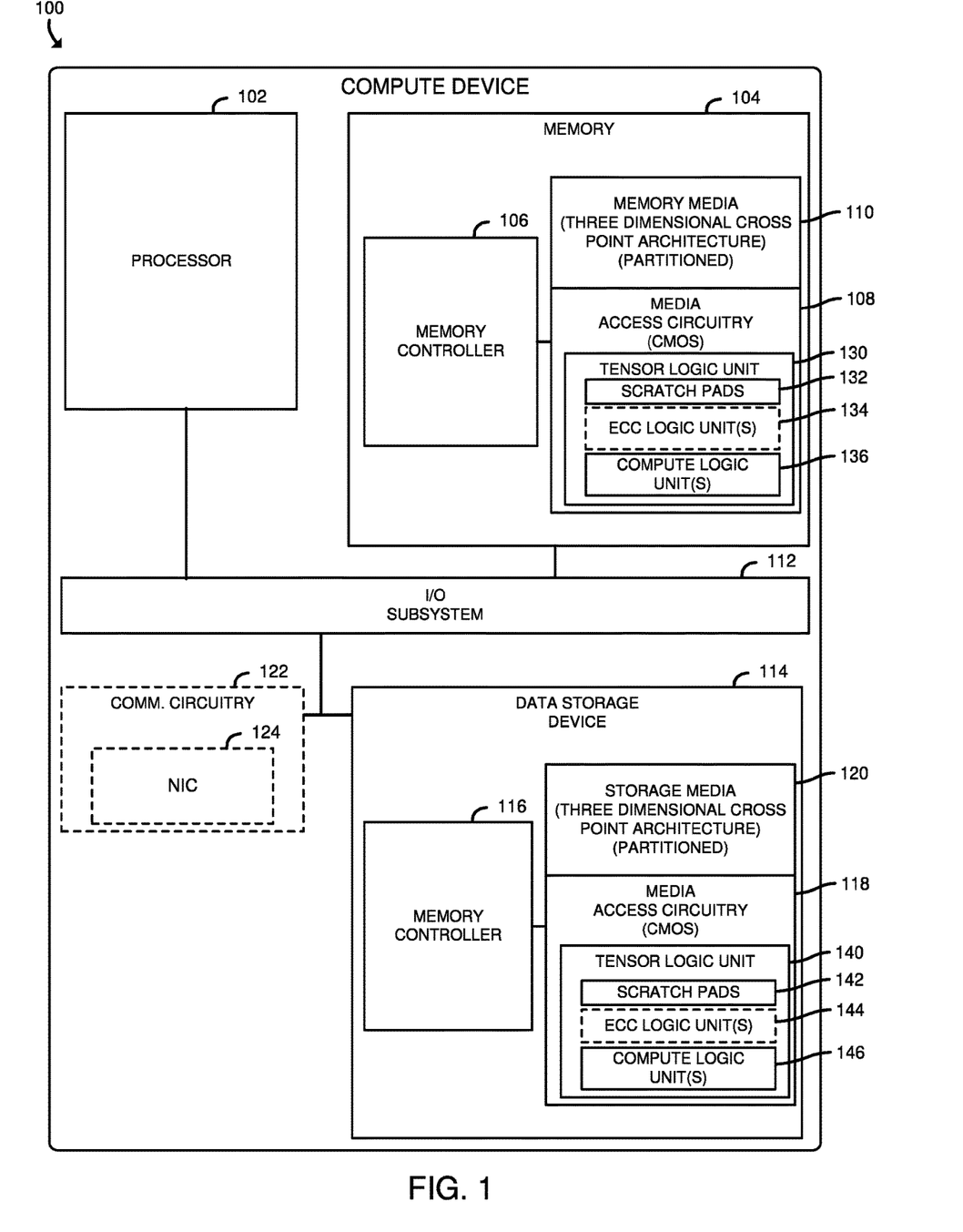
FIG. 1 is a simplified diagram of at least one embodiment of a compute device for performing macro operations in memory.

Referring now to FIG. 1, a compute device 100 for performing macro operations (e.g., an operation representing a set of multiple operations) in memory includes a processor 102, a memory 104, an input/output (I/O) subsystem 112, a data storage device 114, and communication circuitry 122. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. As explained in more detail herein, the media access circuitry 108, in the illustrative embodiment, is local to (e.g., on the same die, in the same package, etc.) the memory media 110 and may perform compute operations on data from the memory media 110 (e.g., any device or material that data is written to and read from), thereby eliminating the need for data to be sent (e.g., through a bus) to the processor 102 or another component of the compute device 100 for computations to be performed on the data. In doing so, the media access circuitry 108 may perform a set of multiple operations on data in the memory media 110 in response to a single request (e.g., sent from the processor 102, through the memory controller 106, to the media access circuitry 108) to perform a macro operation on data in the memory 104 (e.g., data present in the memory media 110). Further, to enable the processor 102 or other component of the compute device 100 that requested the performance of the in-memory macro operation to track the status of the macro operation, the media access circuitry 108, in the illustrative embodiment, provides status data (e.g., any data indicative of whether the macro operation is still in progress or complete) to the component (e.g., by writing the status data to a register that is accessible to the component), rather than requiring the compute device 100 to incur the time and energy expense of continually polling the media access circuitry 108 for an update on the status. As such, the memory 104 may enable the compute device 100 to perform operations on data (e.g., in-memory compute operations associated with artificial intelligence operations, such as matrix operations, also referred to as tensor operations) more efficiently than other compute devices.

The memory media 110, in the illustrative embodiment, has a three dimensional cross point architecture that has data access characteristics that differ from other memory architectures (e.g., dynamic random access memory (DRAM)), such as enabling access to one bit per tile and incurring time delays between reads or writes to the same partition or other partitions. The media access circuitry 108 is configured to make efficient use (e.g., in terms of power usage and speed) of the architecture of the memory media 110, such as by accessing multiple tiles in parallel within a given partition, utilizing scratch pads (e.g., relatively small, low latency memory) to temporarily retain and operate on data read from the memory media 110, and broadcasting data read from one partition to other portions of the memory 104 to enable matrix calculations (e.g., tensor operations) to be performed in parallel within the memory 104. Additionally, in the illustrative embodiment, instead of sending read or write requests to the memory 104 to access matrix data, the processor 102 may send a higher-level request (e.g., a request for a macro operation, such as a request to perform a particular type of matrix calculation) and provide the locations of the matrices to be utilized in the requested operation (e.g., an input matrix, a weight matrix, and an output matrix). Further, rather than sending back the resulting data to the processor 102, the memory 104 may merely send back an acknowledgement or other indication of status (e.g., "Done"), indicating that the requested operation has been completed. As such, many compute operations, such as artificial intelligence operations (e.g., tensor operations involving matrix calculations) can be performed in memory 104, with minimal usage of the bus between the processor 102 and the memory 104. In some embodiments the media access circuitry 108 is included in the same die as the memory media 110. In other embodiments, the media access circuitry 108 is on a separate die but in the same package as the memory media 110. In yet other embodiments, the media access circuitry 108 is in a separate die and separate package but on the same dual in-line memory module (DIMM) or board as the memory media 110.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize a neural network or other machine learning structure to learn and make inferences). In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes the memory media 110 and the media access circuitry 108 (e.g., a device or circuitry, such as integrated circuitry constructed from complementary metal-oxide-semiconductors (CMOS) or other materials) underneath (e.g., at a lower location) and coupled to the memory media 110. The media access circuitry 108 is also connected to the memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on tensor operations to train a neural network and/or to make inferences).

Figure 2:
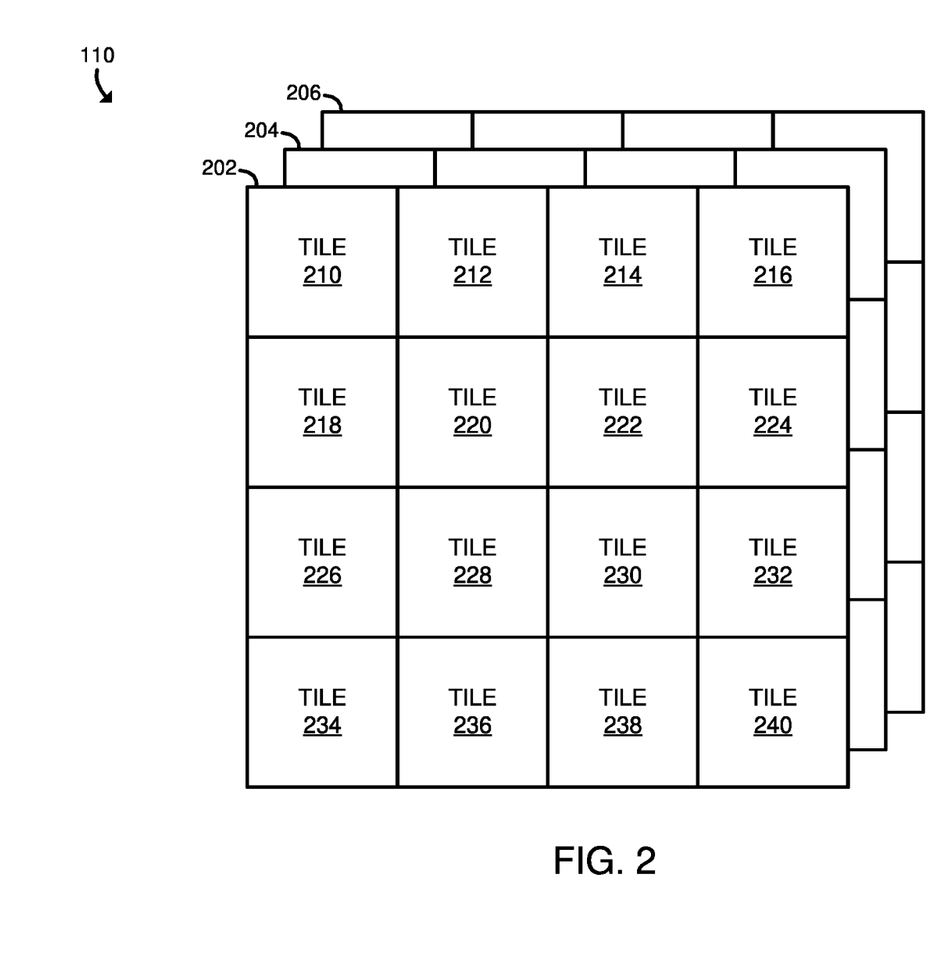
FIG. 2 is a simplified diagram of at least one embodiment of a memory media included in the compute device of FIG. 1.

Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). The memory media 110 includes multiple partitions, each of which includes the tile architecture. The partitions may be stacked as layers 202, 204, 206 to form a three dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

Referring back to FIG. 1, the media access circuitry 108, in the illustrative embodiment, includes a tensor logic unit 130, which may be embodied as any device or circuitry (e.g., CMOS circuitry) configured to offload the performance of tensor operations from other portions of the media access circuitry 108. The tensor logic unit 130, in the illustrative embodiment, includes multiple memory scratch pads 132, each of which may be embodied as any device or circuitry (e.g., static random access memories (SRAMs), register files, etc.) usable to provide relatively fast (e.g., low latency) access to data (e.g., matrix data) that has been read from the memory media 110. In the illustrative embodiment, the scratch pads 132 provide faster read and write access times than the memory media 110 which has comparatively slower access times and a larger capacity. The tensor logic unit 130 may also include an error correction code (ECC) logic unit 134, which may be embodied as any device or circuitry (e.g., reconfigurable circuitry, an ASIC, etc.) configured to perform an error correction algorithm (e.g., a Reed-Solomon algorithm, a Bose-Chaudhuri-Hocquenghem (BCH) algorithm, a low density parity check (LDPC) algorithm, etc.) on data written to and read from the memory media 110 to detect and correct any errors (e.g., due to corruption). Additionally, in the illustrative embodiment, the tensor logic unit 130 includes multiple compute logic units 136 each of which may be embodied as any device or circuitry (e.g., reconfigurable circuitry, ASICs, etc.) configured to perform compute operations on data read from the memory media 110 (e.g., after the ECC logic unit 134 has performed an error correction process on the data).

Figure 3:
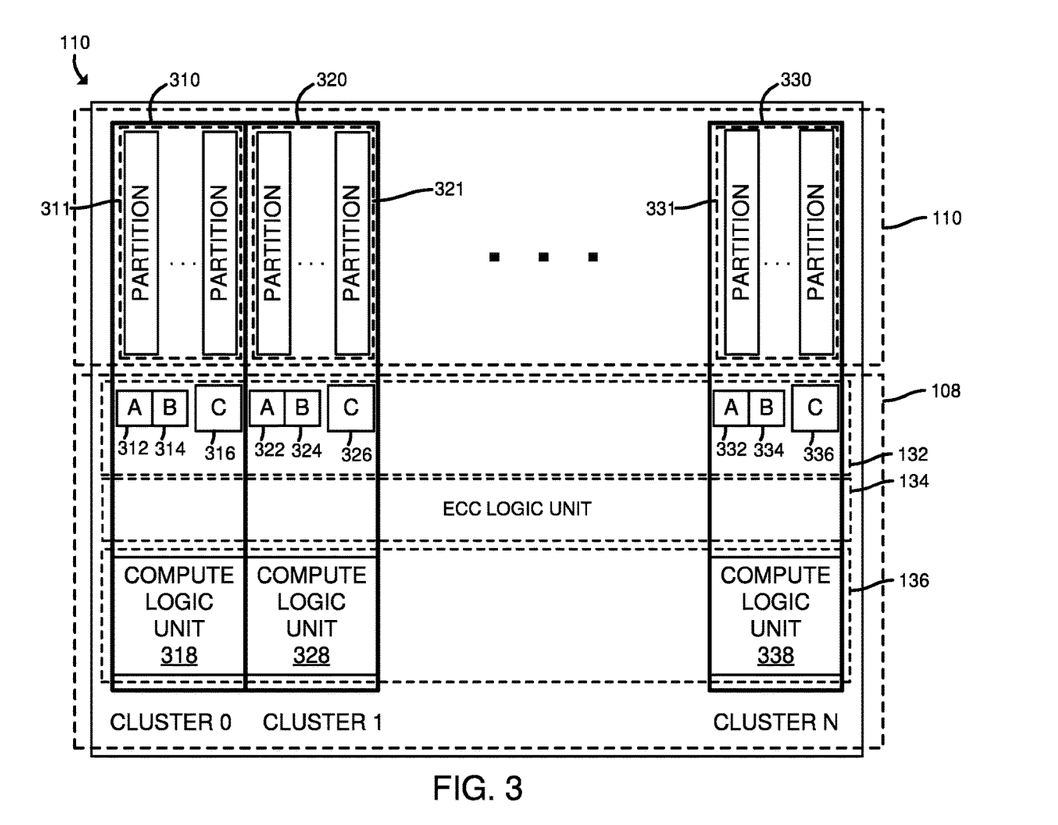
FIG. 3 is a simplified diagram of at least one embodiment of partitions of the memory media and components of a media access circuitry of a memory included in the compute device of FIG. 1.

Referring briefly to FIG. 3, in the illustrative embodiment, components of the memory 104 are divided into clusters 310, 320, 330 (e.g., groupings of components). The cluster 310 includes multiple partitions 311 of the memory media 110, a set of scratch pads 312, 314, 316, each similar to the scratch pads 132 of FIG. 1, and a corresponding compute logic unit 318, similar to the compute logic unit 136 of FIG. 1. Similarly, the cluster 320 includes another set of partitions 321 of the memory media 110, a corresponding set of scratch pads 322, 324, 326, and a corresponding compute logic unit 328. The cluster 330 also includes a set of partitions 331 of the memory media 110, a corresponding set of scratch pads 332, 334, 336, and a compute logic unit 338. In the illustrative embodiment, in operation, the compute logic unit 318 reads a subset of matrix data (e.g., one value of an input matrix A from the set of partitions (e.g., partitions 311)) and provides the read data to the ECC logic unit 134 to perform an error correction process to correct any errors in the data. The compute logic unit 318 may additionally write the data (e.g., after the error correction process has been performed) into the corresponding scratch pad 312 and may broadcast that same subset of the matrix data to the corresponding scratch pads of the other clusters (e.g., to the scratch pads 322, 332). Similarly, the compute logic unit 328 may read, from the corresponding set of partitions 321 another subset of the matrix data (e.g., another value of the input matrix A) into the corresponding scratch pad 322, utilizing the ECC logic unit 134 to correct any errors, and broadcast that subset of the matrix data to the other scratch pads that are to store data for that matrix (e.g., to the scratch pads 312, 332). The compute logic unit 338 may perform similar operations.

By broadcasting, to the other scratch pads, matrix data that has been read from a corresponding set of partitions of the memory media 110, the media access circuitry 108 reduces the number of times that a given section (e.g., set of partitions) of the memory media 110 must be accessed to obtain the same matrix data (e.g., the read matrix data may be broadcast to multiple scratch pads after being read from the memory media 110 once, rather than reading the same matrix data from the memory media 110 multiple times). Further, by utilizing multiple compute logic units 318, 328, 338 that are each associated with corresponding scratch pads 312, 314, 316, 322, 224, 226, 232, 234, 236, the media access circuitry 108 may perform the portions of a tensor operation (e.g., matrix multiply and accumulate) concurrently (e.g., in parallel). It should be understood that while three clusters 310, 320, 330 are shown in FIG. 3 for simplicity, the actual number of clusters and corresponding partitions, scratch pads, and compute logic units may differ depending on the particular embodiment.

Figure 4:
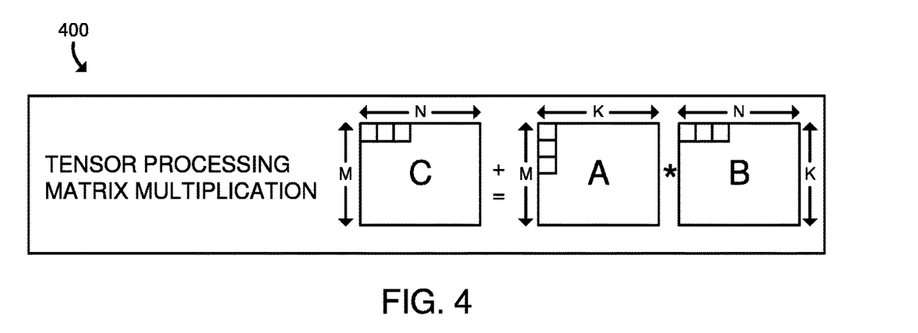
FIG. 4 is a simplified diagram of at least one embodiment of a tensor operation that may be performed in the memory of the compute device of FIG. 1.

Referring briefly to FIG. 4, an example of a matrix multiplication (e.g., matrix multiply and accumulate) operation 400 that may be performed by the memory 104 is shown. As illustrated, matrix data in an input matrix A is multiplied by matrix data in another matrix B (e.g., weight data for a layer of a convolutional neural network) and the resultant data is written to the output matrix C. Each matrix represented in FIG. 4 is temporarily stored as matrix data in the scratch pads 132 of the media access circuitry 108. In some embodiments, the output matrix C may be utilized as an input matrix for a subsequent tensor operation (e.g., as an input matrix for a subsequent layer of a convolutional neural network).

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (Fe-TRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, storage media 120, similar to the memory media 110, and media access circuitry 118, similar to the media access circuitry 108, including a tensor logic unit 140, similar to the tensor logic unit 130, scratch pads 142, similar to the scratch pads 132, an ECC logic unit 144, similar to the ECC logic unit 134, and compute logic units 146, similar to the compute logic units 136. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 122 includes a network interface controller (NIC) 124, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

Figure 5:
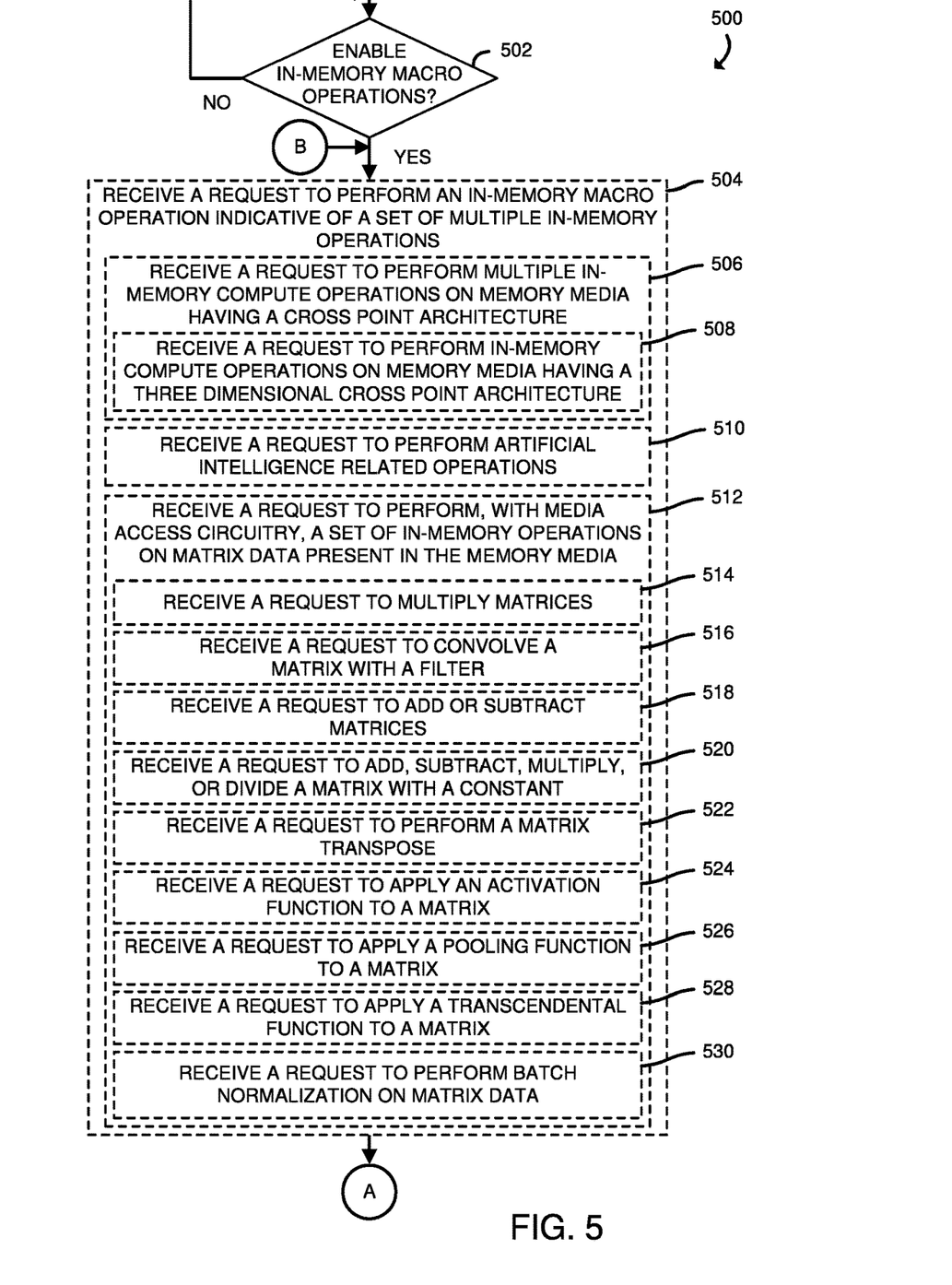
FIGS. 5-7 are simplified diagrams of at least one embodiment of a method for performing macro operations in memory that may be performed by the compute device of FIG. 1.

Referring now to FIG. 5, the compute device 100, in operation, may execute a method 500 for performing in-memory macro operations. The method 500 is described with reference to the memory 104. However, it should be understood that the method 500 could be additionally or alternatively performed using the memory of the data storage device 114. The method 500 begins with block 502 in which the compute device 100 (e.g., the memory 104) determines whether to enable performance of in-memory macro operations. The compute device 100 may enable performance of in-memory macro operations in response to a determination that the tensor logic unit 130 is present in the memory 104 (e.g., in the media access circuitry 108), in response to a determination that a configuration setting (e.g., in a configuration file) indicates to enable in-memory macro operations, and/or based on other factors. Regardless, in response to a determination to enable performance of in-memory macro operations, the method 500 advances to block 504 in which the compute device 100 (e.g., the memory 104) may receive a request (e.g., from the processor 102 executing an application) to perform an in-memory macro operation indicative of a set of multiple in-memory operations. As indicated in block 506, the memory 104 may receive a request to perform multiple in-memory compute operations on memory media having a cross point architecture (e.g., an architecture in which memory cells sit at the intersection of word lines and bit lines and are individually addressable and in which bit storage is based on a change in bulk resistance). Further, and as indicated in block 508, the request may be a request to perform in-memory compute operations on memory media having a three dimensional cross point architecture (e.g., an architecture in which sets of tiles are stacked as layers, as described with reference to FIG. 2). In other embodiments, the request may be to perform the memory access operations on a memory media having a different architecture.

As indicated in block 510, the request may be to perform artificial intelligence operations (e.g., operations relating to training a neural network, producing an inference with a neural network, etc.). Relatedly, and as indicated in block 512, the request may be to perform, with the media access circuitry 108, a set of in-memory operations on matrix data that is present in the memory media 110. For example, the request may be to multiply matrices together, as indicated in block 514. As another example, the request may be to convolve a matrix with a filter, as indicated in block 516. The request may additionally or alternatively be to add or subtract two matrices, as indicated in block 518. As indicated in block 520, the request may be to add, subtract, multiply, or divide a matrix with a constant value. In some embodiments, the request may be to perform a matrix transpose, as indicated in block 522. As indicated in block 524, the request may be to apply an activation function to a matrix (e.g., a rectified linear unit (ReLU) function, a sigmoid function, a hyperbolic tangent function, etc.). In some embodiments, the request may be to apply a pooling function to a matrix (e.g., maxpool/average-pool), as indicated in block 526. The request may additionally or alternatively be to perform a transcendental function (e.g., exponent, logarithmic, square root, etc.) to a matrix, as indicated in block 528. In some embodiments, the request may be to perform batch normalization on matrix data, as indicated in block 530.

Figure 6:
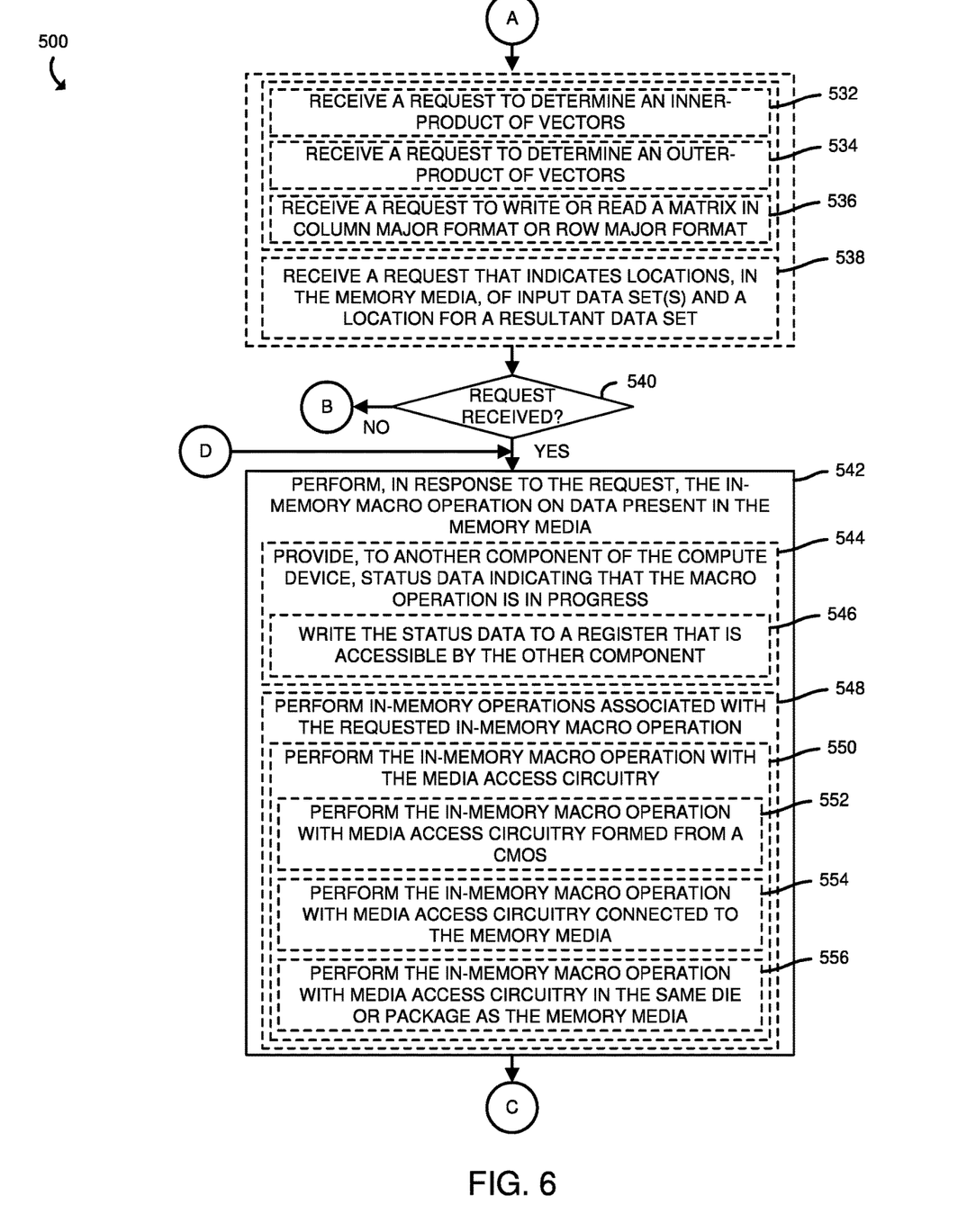
Figure 8:
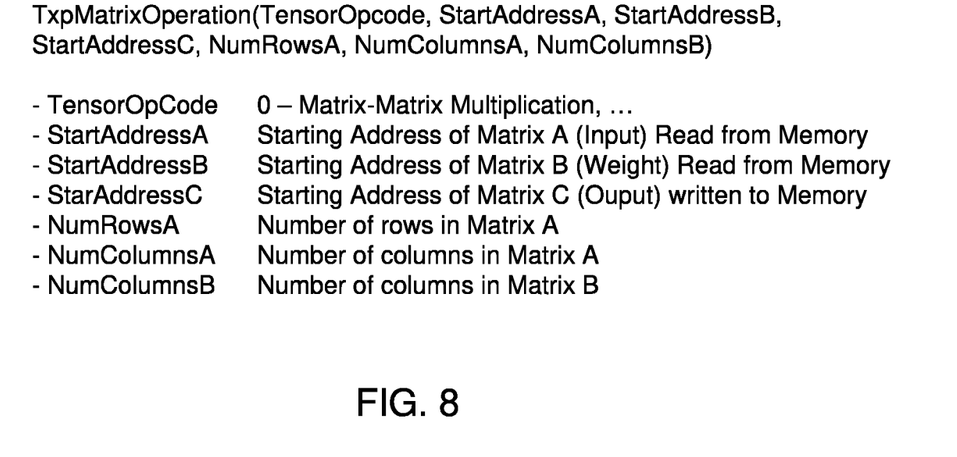
FIG. 8 is a simplified diagram of at least one embodiment of a command format for an in-memory macro operation that may be utilized by the compute device of FIG. 1.

Referring now to FIG. 6, the request may be to determine an inner-product of vectors, as indicated in block 532 or to perform an outer-product of vectors, as indicated in block 534. As indicated in block 536, the request may be to write or read a matrix in column major format (e.g., a format in which consecutive elements of the columns are contiguous) or in row major format (e.g., a format in which consecutive elements of the rows are contiguous). As indicated in block 538, the memory 104 may receive a request that indicates locations, in the memory media 110, of input data sets and a location for a resultant data set. For example, and as shown in FIG. 8, a request for an in-memory macro operation may be formatted as: TxpMatrixOperation(TensorOpcode, StartAddressA, StartAddressB, StartAddressC, NumRowsA, NumColumnsA, NumColumnsB). In the above example, TensorOpcode may be an integer that represents one of the types of macro operations discussed above in blocks 514 through 536. Further, StartAddressA may be a starting address, in the memory media 110, of Matrix A (e.g., an input matrix) and StartAddressB may be a starting address, in the memory media 110, of Matrix B (e.g., a weight matrix). StartAddressC may be a starting address, in the memory media 110, of where the output matrix (e.g., resultant data) should be written when the macro operation is complete. Further, NumRowsA represents the number of rows in Matrix A, NumColumnsA represents the number of columns in matrix A, and NumColumnsB represents the number of columns in Matrix B. Subsequently, in block 540, the compute device 100 (e.g., the memory 104) determines the subsequent course of action based on whether a request was received in block 504. If not, the method 500 loops back to block 504 of FIG. 5 to await a request to perform an in-memory macro operation. Otherwise (e.g., if a request was received), the method 500 advances to block 542, in which the compute device 100 (e.g., the memory 104 and in particular, the media access circuitry 108) performs, in response to the request, the in-memory macro operation on data present in the memory media 110.

Figure 7:
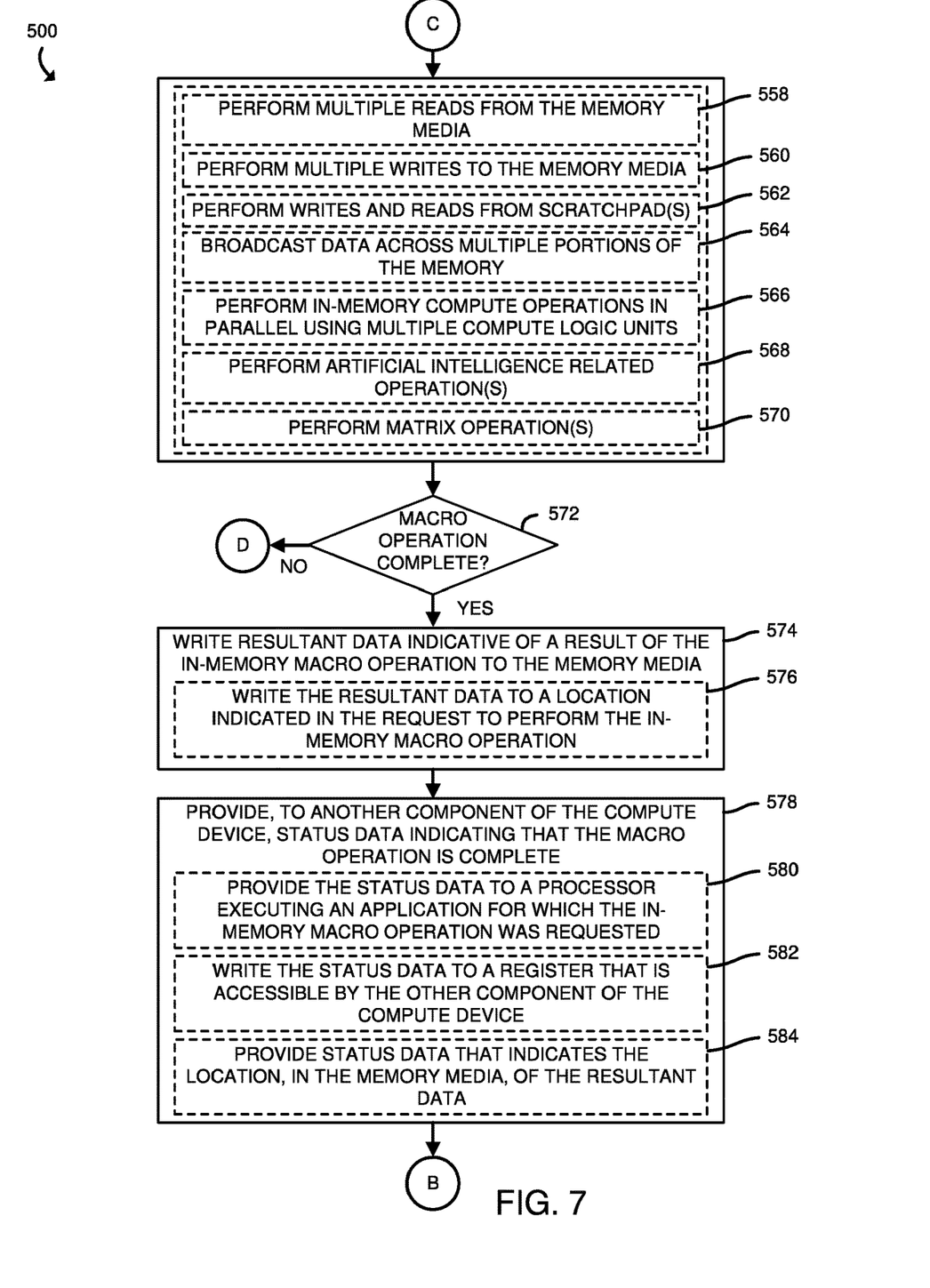

As indicated in block 544, the memory 104 (e.g., the media access circuitry 108) provides, to another component of the compute device 100 (e.g., to the processor 102), status data indicating that the macro operation is in progress (e.g., a boolean value of true, an integer set to one, etc.). In some embodiments, the memory 104 (e.g., the media access circuitry 108) may write the status data to a register (e.g., a memory region) that is accessible by the other component (e.g., the processor 102), as indicated in block 546. As indicated in block 548, the memory 104 performs the in-memory operations associated with the in-memory macro operation that was requested (e.g., in block 504). In the illustrative embodiment, the memory 104 performs the in-memory macro operation with the media access circuitry 108, as indicated in block 550. In doing so, the memory 104 may perform the in-memory macro operation with media access circuitry formed from a complementary metal-oxide semiconductor (CMOS) (e.g., the media access circuitry 108 may be formed from a CMOS), as indicated in block 552. As indicated in block 554, the memory 104 performs the in-memory macro operation with media access circuitry connected to the memory media 110 (e.g., the media access circuitry 108 is connected to the memory media 110). Further, and as indicated in block 556, the memory 104 performs the in-memory macro operation with media access circuitry that is in the same die (e.g., the same semiconductor die) or the same package (e.g., the same semiconductor package) as the memory media 110 (e.g., the media access circuitry 108 is in the same semiconductor die or package as the memory media 110). Referring now to FIG. 7, in performing the in-memory macro operation, the memory 104 (e.g., the media access circuitry 108) may perform multiple reads from the memory media 110, as indicated in block 558. Similarly, and as indicated in block 560, the memory 104 (e.g., the media access circuitry 108) may perform multiple writes to the memory media 110. Relatedly, the memory 104 (e.g., the media access circuitry 108) may perform writes and/or reads from scratchpads (e.g., the scratch pads 132) to enable relatively fast access to frequently used data during the macro operation, as indicated in block 562. As indicated in block 564, the memory 104 (e.g., the media access circuitry 108) may broadcast data across multiple portions of the memory 104 (e.g., by reading data from a partition and broadcasting the read data to scratch pads 132 assigned to different partitions). Further, and as indicated in block 566, the memory 104 (e.g., the media access circuitry 108) may perform in-memory compute operations in parallel using multiple compute logic units (e.g., the compute logic units 136). As indicated in block 568, the memory 104 (e.g., the media access circuitry 108) may perform artificial intelligence related operations (e.g., training a neural network, producing an inference using an artificial network, etc.). Similarly, and as indicated in block 570, the memory 104 (e.g., the media access circuitry 108) may perform matrix operations (e.g., matrix multiplication, matrix transpose, etc.).

In block 572, the compute device 100 (e.g., the memory 104 and more specifically the media access circuitry 108) determines the subsequent course of action based on whether the macro operation is complete (e.g., whether all of the in-memory operations associated with the requested macro operation have been performed). If not, the method 500 loops back to block 542 of FIG. 6 to continue performing the operations associated with the requested macro operation. Otherwise, the method 500 advances to block 574, in which the memory 104 (e.g., the media access circuitry 108) writes resultant data indicative of a result of the in-memory macro operation to the memory media 110. In doing so, and as indicated in block 576, the media access circuitry 108 may write the resultant data to a location that was indicated in the request to perform the in-memory macro operation (e.g., the location for Matrix C, described above). As indicated in block 578, the memory 104 (e.g., the media access circuitry 108) provides, to another component of the compute device 100, status data indicating that the macro operation is complete. For example, and as indicated in block 580, the media access circuitry 108 may provide the status data to a processor (e.g., the processor 102) executing an application for the in-memory macro operation that was requested (e.g., an artificial intelligence application that relies on the in-memory macro operations to train and produce inferences with a neural network). As indicated in block 582, the media access circuitry 108 may write the status data to a register that is accessible by the other component (e.g., the processor 102) of the compute device 100. In some embodiments, the status data may indicate the location, in the memory media 110, where the resultant data (e.g., Matrix C) was written, as indicated in block 584. Subsequently, the method 500 loops back to block 504 of FIG. 5 to await another request to perform an in-memory macro operation.

EXAMPLES

Illustrative examples of the technologies disclosed herein are provided below. An embodiment of the technologies may include any one or more, and any combination of, the examples described below.

Example 1 includes a memory comprising media access circuitry connected to a memory media, wherein the media access circuitry is to receive a request to perform an in-memory macro operation indicative of a set of multiple in-memory operations; and perform, in response to the request, the in-memory macro operation on data present in the memory media.

Example 2 includes the subject matter of Example 1, and wherein to perform, in response to the request, the in-memory macro operation comprises to provide, to a component of a compute device in which the memory is located, status data indicating that the macro operation is in progress.

Example 3 includes the subject matter of any of Examples 1 and 2, and wherein the media access circuitry is further to determine whether performance of the in-memory macro operation is complete; and provide, in response to a determination that performance of the in-memory macro operation is complete, status data indicating that the macro operation is complete.

Example 4 includes the subject matter of any of Examples 1-3, and wherein to provide the status data comprises to write the status data to a register that is accessible by the component of the compute device.

Example 5 includes the subject matter of any of Examples 1-4, and wherein to receive the request comprises to receive a request that indicates a location, in the memory media, of data on which to perform the macro operation.

Example 6 includes the subject matter of any of Examples 1-5, and wherein to receive the request comprises to receive a request that indicates a location, in the memory media, where resultant data indicative of a result of the macro operation is to be written.

Example 7 includes the subject matter of any of Examples 1-6, and wherein to receive a request to perform an in-memory macro operation comprises to receive a request to perform multiple in-memory compute operations.

Example 8 includes the subject matter of any of Examples 1-7, and wherein to receive a request to perform an in-memory macro operation comprises to receive a request to perform artificial intelligence related operations.

Example 9 includes the subject matter of any of Examples 1-8, and wherein to receive a request to perform an in-memory macro operation comprises to receive a request to perform in-memory operations on matrix data present in the memory media.

Example 10 includes the subject matter of any of Examples 1-9, and wherein to receive a request to perform an in-memory macro operation comprises to receive a request to multiply matrices, to convolve a matrix with a filter, to add or subtract matrices, to add, subtract, multiply, or divide a matrix with a constant, to perform a matrix transpose, to apply an activation function to a matrix, to apply a pooling function to a matrix, to apply a transcendental function to a matrix, to perform batch normalization, to determine an inner-product of vectors, to determine an outer-product of vectors, to read or write a matrix in column major format, or to read or write a matrix in row major format.

Example 11 includes the subject matter of any of Examples 1-10, and wherein the media access circuitry is formed from a complementary metal-oxide-semiconductor.

Example 12 includes the subject matter of any of Examples 1-11, and wherein the memory media has a cross point architecture.

Example 13 includes the subject matter of any of Examples 1-12, and wherein the memory media has a three dimensional cross point architecture.

Example 14 includes a method comprising receiving, by media access circuitry connected to a memory media, a request to perform an in-memory macro operation indicative of a set of multiple in-memory operations; and performing, in response to the request and by the media access circuitry, the in-memory macro operation on data present in the memory media.

Example 15 includes the subject matter of Example 14, and wherein performing, in response to the request, the in-memory macro operation comprises providing, to a component of a compute device in which the media access circuitry is located, status data indicating that the macro operation is in progress.

Example 16 includes the subject matter of any of Examples 14 and 15, and further including determining, by the media access circuitry, whether performance of the in-memory macro operation is complete; and providing, by the media access circuitry and in response to a determination that performance of the in-memory macro operation is complete, status data indicating that the macro operation is complete.

Example 17 includes the subject matter of any of Examples 14-16, and wherein providing the status data comprises writing the status data to a register that is accessible by the component of the compute device.

Example 18 includes the subject matter of any of Examples 14-17, and wherein receiving the request comprises receiving a request that indicates a location, in the memory media, of data on which to perform the macro operation.

Example 19 includes one or more machine-readable storage media comprising a plurality of instructions stored thereon that, in response to being executed, cause media access circuitry connected to a memory media to receive a request to perform an in-memory macro operation indicative of a set of multiple in-memory operations; and perform, in response to the request, the in-memory macro operation on data present in the memory media.

Example 20 includes the subject matter of Example 19, and wherein to perform, in response to the request, the in-memory macro operation comprises to provide, to a component of a compute device in which the media access circuitry is located, status data indicating that the macro operation is in progress.

The invention claimed is:

1. A memory comprising:
media access circuitry connected to a memory media, the media access circuitry configured to perform in-memory macro operations, each in-memory macro operation associated with a set of multiple in-memory operations to be performed on data present in the memory media, wherein the media access circuitry is to:
receive a single request to perform an in-memory macro operation;
determine the set of multiple in-memory operations associated with the in-memory macro operation based on the single request; and
perform, in response to the single request, the set of multiple in-memory operations associated with the in-memory macro operation on data present in the memory media, wherein the media access circuitry is further to provide, to a component of a compute device in which the memory is located, status data indicating that the in-memory macro operation is in progress.

2. The memory of claim 1, wherein the media access circuitry is further to:
determine whether performance of the in-memory macro operation is complete; and
provide, in response to a determination that performance of the in-memory macro operation is complete, status data indicating that the in-memory macro operation is complete.

3. The memory of claim 1, wherein to provide the status data the media access circuitry is further to write the status data to a register that is accessible by the component of the compute device.

4. The memory of claim 1, wherein the single request indicates a location in the memory media of data on which to perform the set of multiple in-memory operations associated with the in-memory macro operation.

5. The memory of claim 1, wherein the single request indicates a location in the memory media where a result of the in-memory macro operation is to be written.

6. The memory of claim 1, wherein the in-memory macro operation is associated with a set of multiple in-memory compute operations.

7. The memory of claim 1, wherein the in-memory macro operation is associated with a set of multiple artificial intelligence related operations.

8. The memory of claim 1, wherein the in-memory macro operation is associated with a set of multiple in-memory operations on matrix data present in the memory media.

9. The memory of claim 1, wherein the in-memory macro operation associated with the set of in-memory operations includes in-memory operations to any one or more of:
multiply matrices, convolve a matrix with a filter, any of add or subtract matrices, any of add, subtract, multiply, or divide a matrix with a constant, perform a matrix transpose, apply an activation function to a matrix, apply a pooling function to a matrix, apply a transcendental function to a matrix, perform batch normalization, determine an inner-product of vectors, determine an outer-product of vectors, any of read or write a matrix in column major format, and any of read or write a matrix in row major format.

10. The memory of claim 1, wherein the media access circuitry is formed from a complementary metal-oxide-semiconductor.

11. The memory of claim 1, wherein the memory media has a cross point architecture.

12. The memory of claim 11, wherein the memory media has a three dimensional cross point architecture.

13. A method comprising:
receiving, by media access circuitry connected to a memory media, the media access circuitry configured to perform in-memory macro operations, each in-memory macro operation associated with a set of multiple in-memory operations to be performed on data present in the memory media, a single request to perform an in-memory macro operation;
determining, in response to the request and by the media access circuitry, the set of multiple in-memory operations associated with the in-memory macro operation based on the single request; and
performing, in response to the single request and by the media access circuitry, the set of multiple in-memory operations associated with the in-memory macro operation on data present in the memory media, wherein performing further comprises providing, to a component of a compute device in which the media access circuitry is located, status data indicating that the in-memory macro operation is in progress.

14. The method of claim 13, further comprising:
determining, by the media access circuitry, whether performance of the in-memory macro operation is complete; and
providing, by the media access circuitry and in response to a determination that performance of the in-memory macro operation is complete, status data indicating that the in-memory macro operation is complete.

15. The method of claim 13, wherein providing the status data comprises writing the status data to a register that is accessible by the component of the compute device.

16. The method of claim 13, wherein the single request indicates a location in the memory media of data on which to perform the set of multiple in-memory operations indicated by the in-memory macro operation.

17. One or more non-transitory machine-readable storage media comprising a plurality of instructions stored thereon that, in response to being executed, cause media access circuitry connected to a memory media to:
configure the media access circuitry to associate a set of multiple in-memory operations with an in-memory macro operation, the set of multiple in-memory operations to be performed on data present in the memory media;
receive a single request to perform the in-memory macro operation;
determine, in response to the request, the set of multiple in-memory operations associated with the in-memory macro operation based on the single request; and
perform, in response to the single request, the set of multiple in-memory operations associated with the in-memory macro operation on data present in the memory media, wherein to perform further comprises to provide, to a component of a compute device in which the media access circuitry is located, status data indicating that the in-memory macro operation is in progress.

* * * * *